May 1, 1951

S. STRELZOFF 2,551,569

MANUFACTURE OF AMMONIUM NITRATE

Filed May 24, 1947

INVENTOR
SAMUEL STRELZOFF,
BY E. J. Schaffer
ATTORNEY

May 1, 1951  S. STRELZOFF  2,551,569
MANUFACTURE OF AMMONIUM NITRATE
Filed May 24, 1947  3 Sheets-Sheet 2

INVENTOR
SAMUEL STRELZOFF,
BY E. J. Schaffer
ATTORNEY

May 1, 1951 S. STRELZOFF 2,551,569
MANUFACTURE OF AMMONIUM NITRATE
Filed May 24, 1947 3 Sheets-Sheet 3

INVENTOR
SAMUEL STRELZOFF,
BY E. J. Schaffer
ATTORNEY

Patented May 1, 1951

2,551,569

UNITED STATES PATENT OFFICE 2,551,569

MANUFACTURE OF AMMONIUM NITRATE

Samuel Strelzoff, New York, N. Y., assignor to Chemical Construction Corporation, New York, N. Y., a corporation of Delaware Application May 24, 1947, Serial No. 750,190

1 Claim. (Cl. 23—103)

This invention relates to a process for the manufacture of ammonium nitrate. More particularly it relates to a process wherein a solution of nitric acid is reacted with ammonia and in which solutions containing up to 95% of ammonium nitrate or crystals of this salt are recovered without adding to the process any heat other than the heat of reaction.

Large quantities of relatively dilute nitric acid containing from about 40% to 60% $HNO_3$ are available industrially and for which an economic use must be found. Such acid may be used to produce ammonium nitrate by reacting it with ammonia to produce a relativtly weak solution of ammonium nitrate which must then be concentrated before it can be sold as a commercially acceptable product. Industrially, ammonium nitrate is manufactured either as a crystalline salt or as a solution containing more than 85% and in most cases about 95% of this salt.

In the past this relatively dilute nitric acid has been reacted with ammonia to produce a weak solution of ammonium nitrate which was then concentrated with heat supplied in part by the heat of the reaction plus additional heat in the form of steam which it was always found necessary to use in order to reach the desired concentration for a commercial product. Heretofore it has never been possible to produce from such weak acid, commercial concentrations of ammonium nitrate without supplementing the heat of the reaction with substantial quantities of heat from outside the system. Such additional heat adds to the cost of the product and a considerable saving in cost and a reduction in selling price may be effected if the use of this additional heat can be avoided.

I have devised a process for the production of crystalline ammonium nitrate and solutions containing more than 85% and preferably about 95% of the salt by reacting the relatively weak nitric acid referred to above with ammonia and without using any heat in the process other than the heat of the reaction. This is the principal object of my invention. Another object is to provide an improved process for the production of ammonium nitrate in which the heat of reaction between nitric acid and ammonia is used with increased thermal efficiency.

The process of my invention involves neutralizing a solution of nitric acid with ammonia at a relatively high pressure in a reaction zone to produce hot vapors and a hot solution of ammonium nitrate. The hot solution is passed to a second or concentrating zone maintained at a relatively low pressure to establish a relatively low boiling point for the solution and the hot vapors from the reaction zone are passed in indirect heat relationship with the solution in the second zone to supply heat to boil the solution in the second zone without diluting it with the vapors or their condensate. Under these conditions the solution in the second zone is boiled and concentrated and a product in the form of a solution containing up to 95% of ammonium nitrate or crystals of this salt is recovered without adding to the process any heat other than the heat of reaction.

By maintaining the neutralizing zone at a relatively high pressure and the concentrating zone at a relatively low pressure a sufficient temperature gradient between the temperature of the hot vapors produced in the neutralizing zone and the boiling temperature of the solution in the concentrating zone is set up to allow a rapid and efficient transfer of heat from the hot vapors to the solution to be boiled and concentrated. This method of producing a temperature gradient combined with the indirect heat transfer between the hot vapors and the solution in the concentration zone is one of the principal features of my invention. The advantage of this feature is that the sensible heat and the heat of condensation in the vapors are transferred to the solution to be concentrated without at the same time diluting the solution with the vapors and their condensate.

The process broadly described above may be modified in that a cooling zone or stage may be included in the concentration zone and interposed between the reaction zone and the zone or zones of the concentration zone. The function of such a cooling zone is to cool the hot solution from the reaction zone before it is passed to the first concentration stage in the concentration zone and results in an increase in the overall temperature gradient in the first concentrating stage and a more efficient use of the heat in the hot vapors from the reaction zone. This intermediate cooling and the advantages derived therefrom are an important feature of my invention.

The intermediate cooling described above may be accomplished by a heat exchange unit in which the hot liquid is used to heat a relatively cool one or by a unit which both cools and partially concentrates the solution such as a flash tank. When a flash tank is used, the hot solution from the reaction zone is passed into the flash tank which is maintained at a reduced pressure relative to the reaction zone and as the solution is exposed to the reduced pressure, it boils and a portion of it is vaporized by the sensible heat of the solution and the solution is thereby cooled and tends to approach equilibrium conditions with respect to the reduced pressure maintained in the tank.

The concentration zone may also comprise a plurality of concentrating stages or zones all of which are maintained at a relatively low pressure compared with the reaction zone. Where a plurality of stages is used, the pressure in each successive stage may progresively decrease or may progressively increase from one stage to another.

In practicing my process any desired pressure may be used in the reaction zone, the only limit imposed thereon being the physical strength of the apparatus. Likewise any number of stages may be used in the concentration zone and in practice this is usually limited to that number of stages which is most feasible economically. In addition to this, any amount of water may be brought into the system with either or both the nitric acid and the ammonia. Varying amounts of water thus introduced into the system may be easily handled by my process by appropriately increasing the pressure in the reaction zone and/or the number of stages and the relative pressure in the stages in the concentration zone.

The invention will be illustrated in greater detail by the following drawings and specific examples. It should be understood, however, that while these drawings and examples may describe some of the more specific features of the invention, they are given primarily for purposes of illustration and the invention in its broader aspects is not limited thereto.

Figure 1:
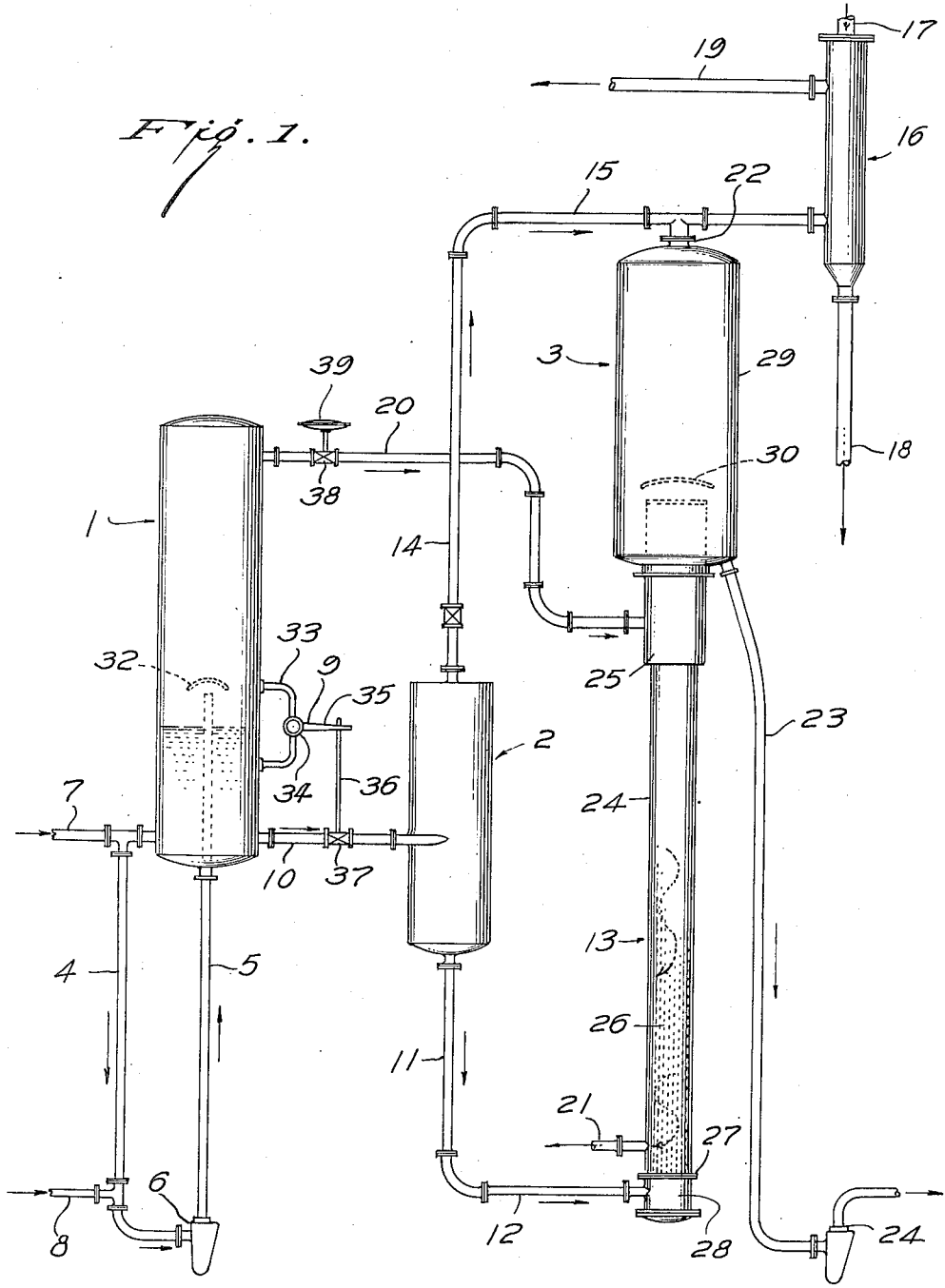
Fig. 1 is a diagrammatic illustration of the process of my invention in which a single stage is used in the concentration zone.

Referring to the drawings, Fig. 1 shows a suitably insulated apparatus assembly in which 1 is a pressure reactor, 2 is a flash tank cooler and 3 is a concentrator. The hot solution of ammonium nitrate resulting from the neutralization of nitric acid with ammonia is passed from the reactor 1 to the flash tank 2 where at a reduced pressure therein it is partially vaporized and cooled. The cooled solution is passed to the concentrator 3 where it is boiled and concentrated at a reduced pressure with heat supplied by indirect contact with hot vapors from reactor 1.

The reactor 1 is provided with a circulating system comprising the pipes 4, 5, and the pump 6. Nitric acid and ammonia are introduced to the reactor continuously through inlet pipes 7 and 8 respectively. The hot vapors and hot solution of ammonium nitrate formed by the reaction collect in reactor 1. Any desired level of the solution may be maintained therein by adjusting valve 37 in line 10 by hand or automatically by the liquid level controlling device 9, for example. This device permits the solution of ammonium nitrate to be withdrawn from the reactor 1 through pipe 10 and into flash tank 2 at a rate which is equal to the rate of introduction of nitric acid and ammonia into the reactor.

In the flash tank 2 a portion of the hot solution from pipe 10, by virtue of the sensible heat in the solution and the reduced pressure maintained in the flash tank, flashes into a vapor and the temperature of the solution is thereby reduced. The unvaporized portion of the solution collects in the bottom of the tank 2 and passes through pipes 11 and 12 into the indirect heat exchange section 13 of the concentrator 3. The vapors from tank 2 are withdrawn through pipes 14 and 15 which lead into a suitable condenser 16 which is supplied with a cooling water inlet 17 and a cooling water outlet 18. The condenser 16 is connected to a suitable vacuum pump, which is not shown, by pipe 19.

The hot vapors which collect above the solution in the reactor 1 are withdrawn from the reactor through line 20 and pass into the heat exchange section 13 of concentrator 3. In section 13 the vapors supply heat to the solution from flash tank 2 to boil and concentrate it and are thereby cooled and condensed. The condensate is withdrawn through outlet pipe 21. A reduced pressure is maintained in the concentrator 3 by connecting it through pipe 15. The pressure over the liquid in the concentrator is sufficiently low so that the boiling point temperature of the solution therein is sufficiently low to condense the vapors. A product in the form of a concentrated solution is withdrawn from the concentrator through line 23 by means of pump 24.

The heat exchange section 13 of the concentrator 3 may be any suitable conventional indirect heat exchanger. As shown it comprises a shell 24 provided with a manifold 25 at its upper extremities into which the hot vapors from the pipe 20 are led. In passing through the exchanger the hot vapors contact a plurality of tubes 26 disposed therein and into which the solution from the flash tank 2 passes. The lower extremities of the tubes 26 are attached to a tube sheet 27 which forms the top of the manifold 28 into which the solution from line 12 passes. The upper extremities of the tubes 26 extend into the section 29 of the concentrator 3 and immediately above their upper extremities and in section 29, baffle plate 30 is disposed.

In the reactor 1 the nitric acid is completely neutralized by the ammonia when the solution issues from pipe 5. The pipe 5 extends into the reactor 1 and terminates just below the baffle 32 which is disposed above the level of liquid in the reactor. This baffle deflects the hot vapors and the hot solution of ammonium nitrate formed by the reaction downwardly and assists in the separation of the liquid from the vapors. The circulating system is desirable since it insures a complete and efficient reaction between the ammonia and the nitric acid.

The constant liquid level device 9 which controls the flow through line 10 may be any suitable commercially available apparatus. As shown it comprises the tube 33 attached at both ends to the reactor 1 and provided with a bulbular section 34 which may contain a float which rises and falls as the level of the liquid in the reactor changes. The vertical motion of the float is transposed by any suitable means to a lever 35 which cooperates with rod 36 to open the valve 37 as the liquid level rises and to close it as the liquid level falls. The vapor flow through line 20 is controlled by valve 38 which may be manually operated but which is preferably opened and closed in response to pressure changes in the reactor by a suitable diaphragm mechanism 39.

Figure 2:
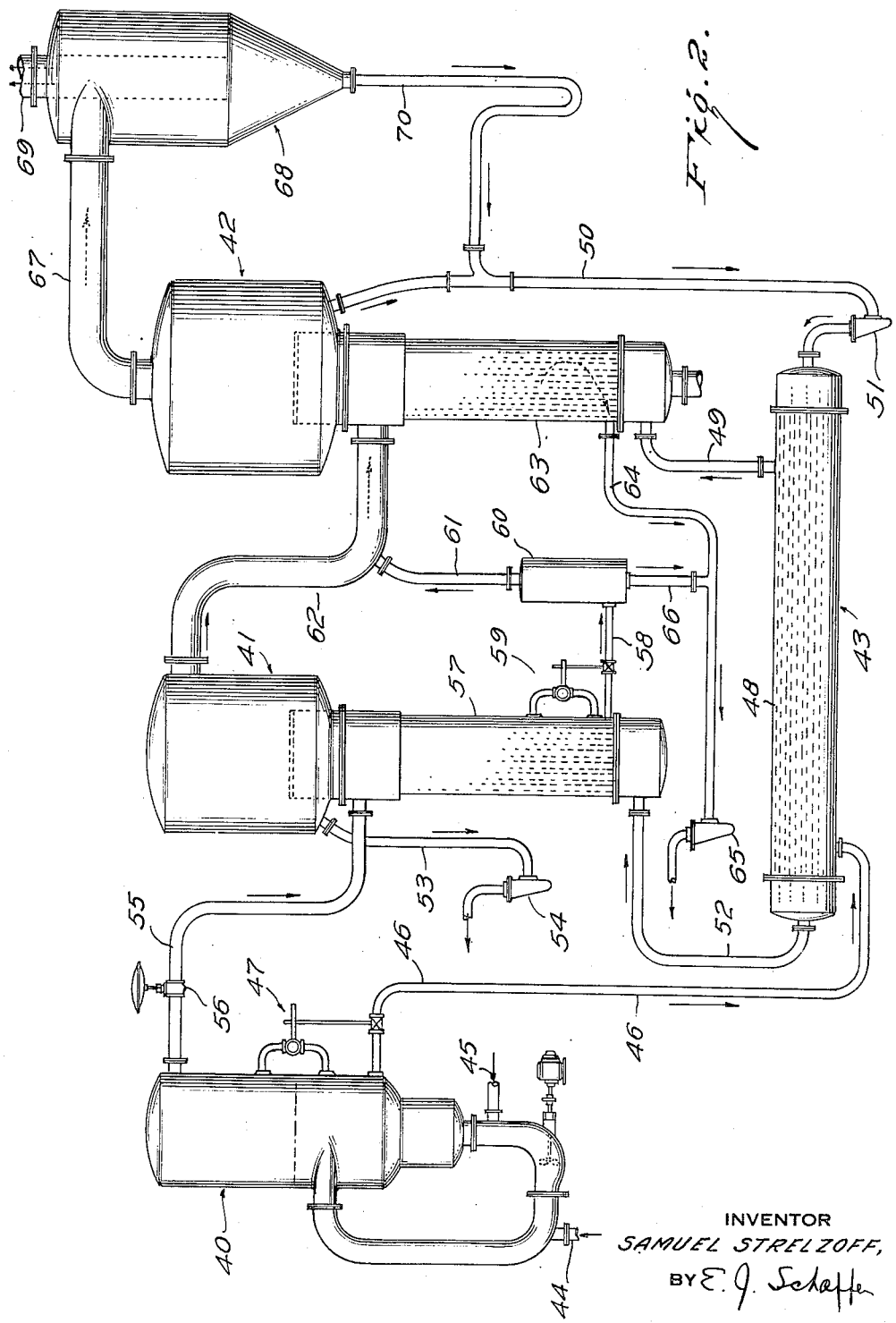
Fig. 2 is a modification of the process in which two stages are used in the concentration zone together with a heat exchange zone.

Fig. 2 illustrates a modification of the process of Fig. 1 which is particularly useful for the recovery of about a 95% solution of ammonium nitrate as a product when nitric acid on the order of 40%–50% HNO₃ is used. As shown in this figure a reactor 40 is combined with two concentrators 41 and 42 and a heat exchanger 43. The hot solution from the reactor is first cooled in the heat exchanger after which it is concentrated in two stages in which the pressure in the first stage is lower than that in the second. The reactor 40 and the concentrators 41 and 42 are similar respectively to the reactor 1 and the concentrator 3 of Fig. 1.

Ammonia is continuously introduced into the reactor 40 through pipe 44 and nitric acid is continuously introduced into the reactor through inlet 45. The hot solution of ammonium nitrate resulting from the reaction is withdrawn from the reactor through pipe 46 in a suitably controlled manner by the constant level controlling device 47 for example. The hot solution of ammonium nitrate which is to be cooled passes into the heat exchanger 43 and around the tubes 48 disposed therein, emerging from the heat exchanger through pipe 49 and then passes into the concentrator 42.

In the concentrator 42 which is maintained at a reduced pressure, the solution is boiled and partially concentrated with heat supplied by hot vapors which will be described hereinafter. The partially concentrated solution, which is now at a relatively low temperature by virtue of the low boiling point temperature established in the concentrator 42 because of the low pressure maintained therein, is withdrawn through pipe 50 by means of pump 51 and is passed through the tubes 48 of the heat exchanger 43 where the solution is heated by the hot solution from the reactor 40. After being heated in the heat exchanger 43, the solution is withdrawn through pipe 52 and passes into the second concentrator 41 also maintained at a reduced pressure but which pressure is higher than that in concentrator 42. It is further concentrated to the concentration of the final product by hot vapors which will be described hereinafter. The product is withdrawn from the concentrator through pipe 53 by means of pump 54.

The hot vapors collecting above the solution in the reactor 40 are withdrawn therefrom through line 55. The rate of withdrawal may be controlled by means of valve 56 which may be either mechanically or manually operated. While still substantially at the same pressure as that of the reactor, the hot vapors are passed into the heat exchanger section 57 of concentrator 41 where they supply heat to the solution to be concentrated therein. In doing so, they are cooled and condensed. The condensate collects in the lower portion of the heat exchanger section 57 and may be withdrawn through line 58 at a controlled rate such as a rate that will maintain a constant level of condensate in section 57 by constant level controlling device 59. The hot condensate withdrawn by line 58 is passed into a flash tank 60 which is maintained at a reduced pressure. In the flash tank 60, which in some cases may be a steam trap, a portion of the condenate is vaporized and the hot vapors are withdrawn through pipe 61 and enter pipe 62 where they merge with the vapors passing therein.

The vapors from the solution, which is boiled and concentrated in the concentrator 41 at a reduced pressure, are withdrawn through pipe 62 where these vapors are combined with those from the flash tank 60 and which enter the pipe 62 from the pipe 61 as described above. The combined vapors pass to the heat exchanger section 63 of concentrator 42 where they are again condensed while heating the boiling solution therein. The condensate is withdrawn from section 63 through pipe 64 by means of pump 65. The condensate that collects on the lower portion of the flash tank 60 is also withdrawn by pump 65 by passing through pipe 66 and into pipe 64.

The vapors from the boiling solution in concentrator 42 are withdrawn through pipe 67. These vapors may contain entrained ammonium nitrate in the form of a mist which may be recovered by leading the vapors into mist separator 68. The mist settles to the bottom of the separator and collects as a liquid which may be returned to the system by pipe 70 which leads into pipe 50. A vacuum is maintained in the concentrator 42 and separator 68 by connecting the separator through line 69 to suitable vacuum-producing apparatus such as a water-cooled condenser followed by a vacuum pump or steam jet.

A feature of the process of Fig. 2 is that by using a heat exchanger between the reactor and the first stage of the concentration, the pressure in the first concentrator may be lower than that in the second concentrator. In addition to this, a high over-all temperature gradient between the vapors and the solution in each concentrator is obtained. This arrangement is particularly advantageous when a product in the form of a very concentrated solution such as about 95% ammonium nitrate is to be produced from a 40% to 50% solution of nitric acid. The reason for this is that the solution may be concentrated rapidly and efficiently in the first effect at a reduced pressure to a point just below that at which crystallization of the ammonium nitrate salt occurs. The solution is then further concentrated in the second effect which is maintained at a reduced pressure but higher than in the first effect. Thus the boiling point and the temperature in the second effect will be higher than that in the first and permits further concentration of the solution without crystallization.

Figure 3:
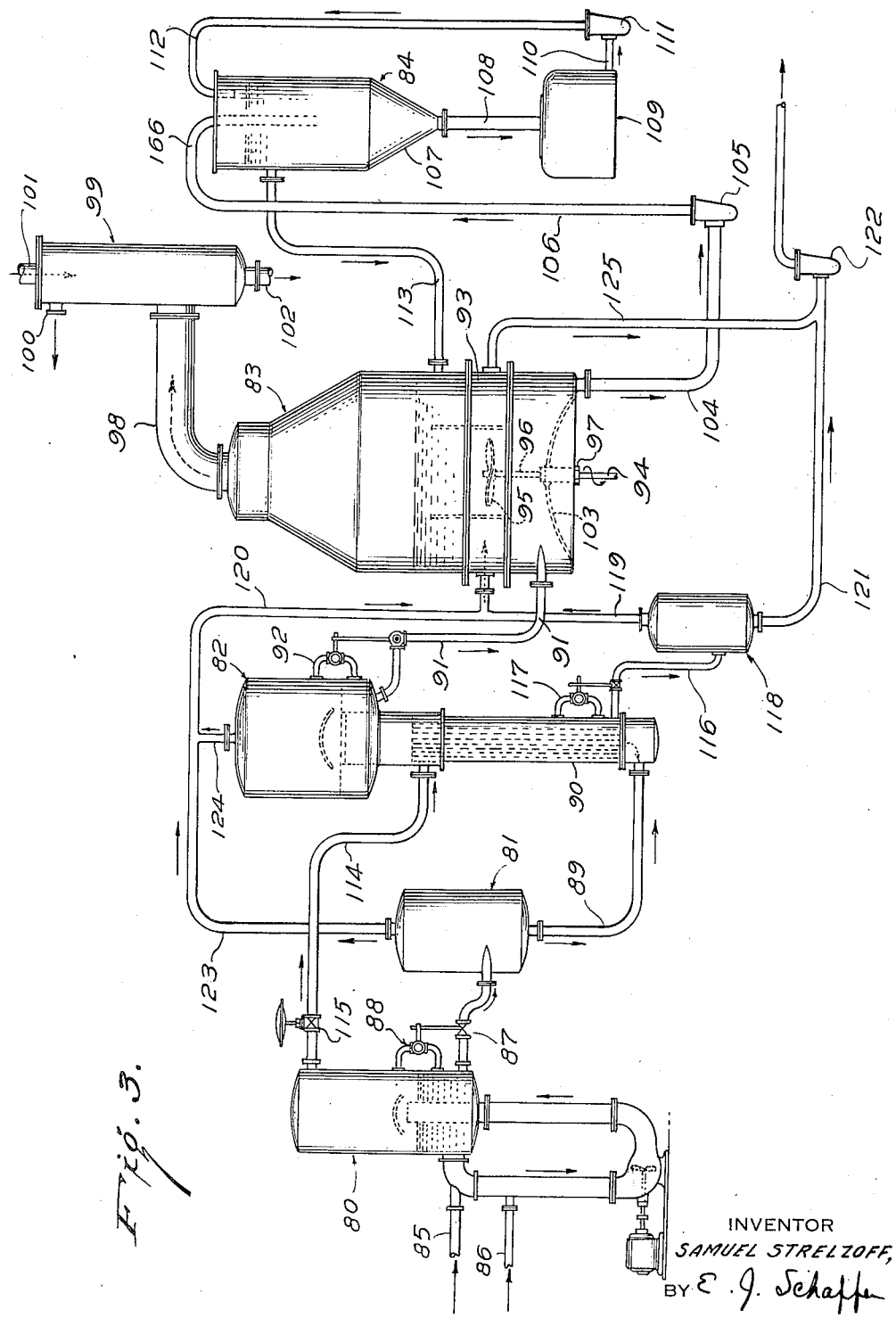
Fig. 3 is a further modification for the production of crystalline ammonium nitrate.

The modification of the process shown in Fig. 3 is useful for the production of a crystalline ammonium nitrate product when solutions of nitric acid on the order of 40%–50% nitric acid are used. The apparatus shown in this figure comprises a combination of a pressure reactor 80, a cooler or flash tank 81, a first concentrator 82, a second concentrator which is also a crystallizer 83, and a salt separator 84.

Nitric acid and ammonia are introduced respectively into inlet pipes 85 and 86 of reactor 80 which is similar to the reactor described in Figs. 1 and 2. The hot solution of ammonium nitrate formed by the reaction is led from the reactor through pipe 87 into the flash tank 81 at a rate which may be controlled by the constant level device 88.

A portion of the solution flashes into a vapor in flash tank 81 which is maintained at a relatively low pressure compared to that in the reactor 80. The heat for the vaporization that takes place in flash tank 81 is supplied by the sensible heat of the solution and the solution is thereby cooled. The relatively cool solution is led from the flash tank through pipe 89 into the indirect heat exchanger portion 90 of the concentrator 82 which is similar to the concentrators of Figs. 1 and 2. At the relatively low pressures maintained in the concentrator 82 and with the heat supplied by the hot vapors to be described hereinafter, the solution is boiled and is further concentrated to a point below the crystallization point of the solution. The relatively concentrated solution is withdrawn from the reactor 82 through pipe 91 and is passed to crystallizer 83 which is maintained at a reduced pressure which is lower than that in concentrator 82. The rate at which the solution is passed from the concentrator 82 to the crystallizer may be controlled by the constant level controlling device 92.

The concentrator and crystallizer 83 is provided with a heat exchange section 93. This section comprises a plurality of tubes (not shown) jacketing the crystallizer below the level of the solution therein. Hot vapors to be described later pass into the tubes and make indirect heat contact with the solution in the crystallizer. The solution is kept in constant motion by a suitable stirrer 94 which is promotion with a blade 95 mounted on a shaft 96 which passes through the bottom of the crystallizer through a packing gland 97. The shaft 96 is rotated by a motor which is not shown. The pipe 98 at the top of the concentrator 93 leads into a conventional condenser 99 which in turn is connected to a suitable vacuum pump (not shown) by pipe 100. Cooling water is supplied to the condenser through an inlet 101 and leaves the condenser through outlet 102. The bottom wall 103 of the crystallizer is curved so that the crystals of the salt tend to collect around the perimeter.

At the pressure maintained in the concentrator 83 and with the heat supplied by the hot vapors, the solution is boiled and vaporized at a rate which is equivalent to the rate of introduction of the solution into the crystallizer. The vapors thus formed are withdrawn through pipe 98. A slurry of crystalline ammonium nitrate is withdrawn from the bottom of crystallizer 83 through pipe 104 by means of pump 105 and is passed through pipe 106 to salt separator 84. The crystals settle into the conical bottom portion 107 of the salt separator and are withdrawn through pipe 108 and pass into centrifuge 109 where they are whirled and from which a relatively dry crystalline ammonium nitrate product is recovered. The solution that is separated from the crystals in the centrifuge is withdrawn through pipe 110 by pump 111 and it is returned to the salt separator through pipe 112. The supernatant solution from the top of the separator 84 is withdrawn through pipe 113 and is returned to the concentrator 83.

The hot vapors that collect above the level of the solution in reactor 80 are withdrawn from the reactor through line 114. The rate of withdrawal may be controlled by valve 115 which may be either manually or automatically controlled such as for example by a diaphragm which is sensitive to fluctuations in pressure within the reactor. The hot vapors at substantially the same pressure as that in the reactor pass through line 114 and into the heat exchanger section 90 of the concentrator 82 where they come in indirect heat exchange with the solution entering therein from pipe 89. In the course of contributing heat to the solution in this heat exchanger section, the hot vapors are cooled and condensed and the condensate is withdrawn from the bottom of the heat exchanger section through pipe 116 at a rate which may be controlled by a constant level controlling device 117 which may be a part of the line 116. The condensate passes from the line 116 into flash tank 118 which is maintained at a relatively low pressure. At the reduced pressure and from the sensible heat content of the condensate, a portion of it flashes into a vapor which is withdrawn from the flash tank through line 119 and passes into line 120. The unvaporized portion of the condensate in flash tank 118 is withdrawn from the bottom thereof through pipe 121 by means of pump 122.

The flash tanks 81 and 118 and concentrator 82 are all maintained at substantially the same reduced pressure. The vapor from the flash tank 81 is withdrawn from the top thereof through pipe 123 and the vapor formed in concentrator 83 is withdrawn through pipe 124. Vapors from both these sources pass into pipe 120 where they merge with the vapors from the flash tank 118. The combined vapors are led from pipe 120 into the tubes of the heat exchange section 93 of concentrator 83 where they are cooled and condensed. The condensate is withdrawn from section 93 through pipe 125 which leads into pipe 121 and is withdrawn from the system through pump 122.

From the foregoing description of preferred embodiments of the invention it will be seen that in the concentration stage, or where a plurality of stages is used then in each stage of the concentration zone, hot vapors come in indirect contact with a relatively cool solution. The pressure maintained over the solution in each stage is such that the boiling point temperature of the solution which is ultimately withdrawn from that stage is at or below the condensation temperature of the hot vapors at the pressure at which they are maintained. As heat passes to the solution the vapors are cooled and condensed so that they contribute both sensible heat and heat of condensation to the solution. This heat transfer is accomplished without diluting the solution with the vapors and their condensate because these two fluids are in indirect contact with each other.

My invention will be further illustrated by the following specific examples which illustrate the preferred modes of practicing it.

*Example 1*

In an assembly of apparatus such as shown in Fig. 1, 57% HNO₃ at 77° F. is introduced into the reactor at the rate of 2940 lbs. per hour along with 425 lbs. per hour of ammonia gas also at a temperature of 77° F. The reaction between the ammonia and the nitric acid is carried to completion in the reactor in which the pressure is maintained at 65 lbs. per square inch (about 50 lbs. gauge). Under these conditions vapors at 298° F. are withdrawn from the line 20 at the rate of 675 lbs. per hour and pass through the indirect heat exchange section 13 of the concentrator 3 where the vapors cool and condense as they heat the solution passing into the concentrator from line 12. Condensate is withdrawn from section 13 at the rate of 675 lbs. per hour at a temperature of 277° F.

A 74.5% solution of ammonium nitrate at a temperature of 336° F. is withdrawn from the reactor 1 at a rate of 2690 lbs. per hour while maintaining the solution in the reactor at a constant level. This hot solution is passed through the line 19 to the flash tank 2 which is maintained at 18.4 inches of mercury. Under this relatively low pressure, 90 lbs. per hour of water vapor are flashed from the solution and it is possible to withdraw therefrom a 77% ammonium nitrate solution at 277° F. at the rate of 2600 lbs. per hour.

The solution withdrawn from the flash tank 2 is passed through lines 11 and 12 and passes into the tubes 26 disposed in heat exchange section 13 of concentrator 3 and the pressure in the concentrator is maintained at a pressure of 18.4 inches of mercury. In the heat exchanger section 13 of the concentrator the solution makes indirect heat exchange contact with the hot vapors from the reactor and with the heat supplied by the hot vapors and under the reduced pressure, the solution is vaporized in the concentrator at the rate of 490 lbs. of water per hour, allowing a 95% solution of ammonium nitrate at 277° F. to be withdrawn from the concentrator at the rate of 2110 lbs. of solution per hour. The 490 lbs. of vapor per hour from the concentrator and the 90 lbs. per hour of the vapor from the flash tank are withdrawn through lines 22 and 15 respectively and pass to the condenser 16 where the vapors are condensed and discarded with the cooling water.

*Example 2*

In the apparatus assembly of Fig. 2, 53,200 lbs. per hour of a 47.5% solution of nitric acid at 77° F. are introduced into the pressure reactor 40 along with 6800 lbs. per hour of ammonia which is also at a temperature of 77° F. The pressure in the reactor is maintained at 65 lbs. per square inch (about 50 lbs. gauge). Under these conditions 50,950 lbs. per hour of a 63% solution of ammonium nitrate at 325° F. are withdrawn from the reaction through pipe 46 and are passed into the heat exchanger 48 from which the solution emerges through pipe 49 at a temperature of 235° F. and passes into the tubes of the heat exchanger 63 of the concentrator 42.

With the heat supplied by hot vapors in heat exchanger section 63, the solution in concentrator 42 is boiled under a vacuum of 27 inches of mercury. 40,950 lbs. per hour of 78.6 solution of ammonium nitrate at a temperature of 148° F. is withdrawn through pipe 50 and passes through the heat exchanger 48 from which it is withdrawn through pipe 52 at a temperature of 277° F. This reheated solution is introduced into the heat exchanger section 57 of concentrator 41. A vacuum of 18.4 inches of mercury is maintained in concentrator 41. At this reduced pressure and with heat supplied by the hot vapors in the heat exchanger section 57, the solution is boiled to further concentrate it and 33,800 lbs. per hour of a 95% solution of ammonium nitrate at a temperature of 277° F. is withdrawn from concentrator 41 through line 53 as a product from the process.

Under the conditions of the reaction, 9050 lbs. per hour of hot vapors at a temperature of 298° F. are withdrawn from reactor 40 through line 55 and pass into the heat exchange section 57 of concentrator 41 where they make indirect heat contact with the solution to be concentrated. Sufficient heat is transferred to the solution from the vapors to boil and concentrate it to the desired extent and in so doing the vapors are cooled and condensed. 9050 lbs. per hour of condensate are withdrawn from section 57 through pipe 58 and pass into flash tank 60 which is maintained under a vacuum of 18.4 inches of mercury. At this reduced pressure 1150 lbs. per hour of vapor at 168° F. are withdrawn from the flash tank through line 61 and pass into line 62 where they merge with vapors from the boiling solution in concentrator 41. Vapors at the rate of 7450 lbs. per hour at 168° F. are withdrawn from concentrator 41 through line 62 and these vapors combined with those from flash tank 60 are passed into the heat exchanger section 63 of concentrator 42. Condensate at 168° F. is withdrawn from section 63 through pipe 64 at the rate of 8600 lbs. per hour and merges in this pipe with 7900 lbs. per hour of condensate at 168° F. which are withdrawn from flash tank 60 through pipe 66. Thus a total of 16,500 lbs. per hour of vapor and condensate are withdrawn from the system through pipe 64 by pump 65.

*Example 3*

In a process according to that shown in Fig. 3, ammonia at the rate of 6800 lbs. per hour and a 47.5% solution of nitric acid at the rate of 53,200 lbs. per hour both at a temperature of 77° F. are introduced into pressure reactor 80 which is maintained at 65 lbs. per square inch pressure. 50,950 lbs. per hour of a 63% solution of ammonium nitrate at 325° F. are withdrawn from the reactor through pipe 87 and pass into flash tank 81 which is maintained at atmospheric pressure where a portion of the solution is vaporized. 47,950 lbs. per hour of a 67.5% solution of ammonium nitrate at a temperature of 230° F. are withdrawn from the bottom of the flash tank through line 89 and pass into the heat exchange section 90 of concentrator 82. Atmospheric pressure is maintained in the concentrator and at this pressure and with heat supplied by hot vapors the solution is boiled and concentrated. 41,000 lbs. per hour of a 78% solution of ammonium nitrate at a temperature of 258° F. are withdrawn from concentrator 82 through pipe 91 and are introduced into crystallizer 83 which is kept under vacuum of 27 inches of mercury.

Under these conditions in the crystallizer, 9900 lbs. per hour of vapor at 115° F. are boiled from the solution therein and are withdrawn through pipe 98. At this rate of vaporization a saturated solution containing about 82.5% of ammonium nitrate at 154° F. is maintained in the crystallizer and as additional ammonium nitrate is brought into the crystallizer with the solution from concentrator 82, it is separated from the solution in the form of crystals.

A slurry of ammonium nitrate is continuously withdrawn from the bottom of the crystallizer and passes through pipes 104 and 106 to settling tank 84 where the crystals settle out of the solution and the supernatant liquor is returned to the crystallizer through line 113. The wet slurry of crystals from the settling tank are passed into the centrifuge 109 where the excess solution is separated and returned to the settling tank through line 112. A relatively dry, crystalline ammonium nitrate at the rate of about 32,100 lbs. per hour is recovered as a product from the centrifuge.

9050 lbs. per hour of vapors at a temperature of 298° F. are withdrawn from the reactor 80 through line 114, and are introduced into the heat exchanger section 90 of concentrator 82 where they are cooled and condensated while heating the solution to be boiled in the concentrator. The condensate is withdrawn from the heat exchanger section 90 through line 116 and is introduced into the flash tank 118 which is maintained at atmospheric pressure. A portion of the condensate is reconverted into vapors at the pressure maintained in the flash tank. These vapors which are at a temperature of 212° F. are withdrawn through line 119 and pass into line 120.

3000 lbs. per hour of vapors at 212° F. are withdrawn from flash tank 81 through line 123 and 6950 lbs. per hour of vapor at 212° F. are withdrawn from concentrator 82 through line 124. These vapors are combined in line 129 together with those from tank 118 and are passed into heat exchange section 93 of crystallizer 83. In this section they are cooled and condensed while transferring heat to the boiling solution in the crystallizer. The condensate and the residual vapors are withdrawn from section 93 through lines 125 and 121 and are discharged from the system through pump 122 which also withdraws any condensate from the bottom of tank 118 through line 121.

What I claim is:

A process for the production of ammonium nitrate which comprises the steps of neutralizing a solution of 40% to 60% nitric acid with ammonia in a reaction zone maintained at a relatively high pressure, forming therein from the heat of reaction hot vapors and a hot solution of ammonium nitrate, passing the hot solution to a second zone maintained at a lower pressure than in the reaction zone to establish a lower boiling point for the solution, boiling the solution therein and reducing its temperature, passing the relatively cool solution to a third zone maintained at a lower pressure than in the reaction zone, passing the hot vapors from said first zone in indirect heat exchange relations with the cooler solution in said third zone thereby supplying heat to further boil the solution without diluting it with said vapors and their condensate, boiling the solution in the third zone and recovering therefrom a solution containing about 85 to 95% ammonium nitrate without adding to the process any heat other than the heat of reaction.

SAMUEL STRELZOFF.

REFERENCES CITED

The following references are of record in the file of this patent:

UNITED STATES PATENTS

| Number | Name | Date |
|---|---|---|
| 2,167,464 | Rogers et al. | July 25, 1939 |
| 2,217,099 | Burman | Oct. 8, 1940 |

OTHER REFERENCES

Walker et al.: "Principles of Chemical Engineering," 3rd ed., 1937, pages 389, 407, 408. Published by McGraw-Hill, New York.